United States Patent
Dhayapule et al.

(10) Patent No.: US 10,108,683 B2
(45) Date of Patent: Oct. 23, 2018

(54) DISTRIBUTED BALANCED OPTIMIZATION FOR AN EXTRACT, TRANSFORM, AND LOAD (ETL) JOB

(71) Applicant: International Business Machines Corporation, Armonk, NY (US)

(72) Inventors: Raghavendra R. Dhayapule, Bangalore (IN); Jean-Claude Mamou, Millbury, MA (US); Yeh-Heng Sheng, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 14/695,673

(22) Filed: Apr. 24, 2015

(65) Prior Publication Data

US 2016/0314175 A1    Oct. 27, 2016

(51) Int. Cl.
| | |
|---|---|
| *G06F 7/00* | (2006.01) |
| *G06F 17/00* | (2006.01) |
| *G06F 17/30* | (2006.01) |
| *H04L 12/803* | (2013.01) |
| *H04L 29/08* | (2006.01) |
| *G06F 15/16* | (2006.01) |

(52) U.S. Cl.
CPC .. *G06F 17/30563* (2013.01); *G06F 17/30914* (2013.01); *G06F 17/30958* (2013.01); *H04L 47/125* (2013.01); *H04L 67/1002* (2013.01)

(58) Field of Classification Search
CPC .................. G06F 17/30563; H04L 67/1002
USPC ....................................................... 707/602
See application file for complete search history.

(56) References Cited

U.S. PATENT DOCUMENTS

| | | |
|---|---|---|
| 8,719,769 B2 | 5/2014 | Castellanos et al. |
| 9,535,965 B2 * | 1/2017 | Venkatasubramanian ................... G06F 17/30563 |

(Continued)

FOREIGN PATENT DOCUMENTS

CN        101828182 A    9/2010

OTHER PUBLICATIONS

U.S. Appl. No. 15/175,926, filed Jun. 7, 2016, entitled "Distributed Balanced Optimization for an Extract, Transform, and Load (ETL) Job", invented by R.R. Dhayapule et al., Total 54 pp. [57.356C1 (Appln)].

(Continued)

*Primary Examiner* — Usmaan Saeed
*Assistant Examiner* — Brian E. Weinrich
(74) *Attorney, Agent, or Firm* — Janaki K. Davda; Konrad, Raynes, Davda & Victor LLP

(57) ABSTRACT

Provided are techniques for distributed balanced optimization for an Extract, Transform, and Load (ETL) job across distributed systems of participating ETL servers using a data flow graph with links and stages for an ETL job to be executed by participating ETL servers is received. A distributed job execution plan is generated that breaks the data flow graph into job segments. The job segments each include a subset of the links and stages and map to one participating ETL server from the distributed systems to meet an optimization criteria across the distributed systems. The job segments are distributed to the participating ETL servers based on the mappings for parallel execution. Also, the distributed job execution plan utilizes statistics to reduce data movement and redundancies and to balance workloads across the distributed systems.

12 Claims, 16 Drawing Sheets

(56) References Cited

U.S. PATENT DOCUMENTS

| | | | |
|---|---|---|---|
| 2008/0168082 A1* | 7/2008 | Jin | G06F 8/20 707/999.102 |
| 2009/0240663 A1 | 9/2009 | Plattner et al. | |
| 2011/0047525 A1* | 2/2011 | Castellanos | G06F 9/4436 717/104 |
| 2011/0295795 A1* | 12/2011 | Venkatasubramanian | G06F 17/30563 707/602 |
| 2012/0150791 A1* | 6/2012 | Willson | G06F 17/30563 707/600 |
| 2013/0066826 A1 | 3/2013 | McDonald et al. | |
| 2013/0073515 A1* | 3/2013 | Bhide | G06F 17/30563 707/602 |
| 2013/0227573 A1* | 8/2013 | Morsi | G06F 17/30563 718/100 |
| 2014/0089251 A1 | 3/2014 | Bhide et al. | |

OTHER PUBLICATIONS

Preliminary Amendment for U.S. Appl. No. 15/175,926, filed Jun. 7, 2016 by R.R. Dhayapule et al., Total 5 pp. [57.356C1 (PrelimAmend)].

List of IBM Patents or Patent Applications Treated as Related, dated Jun. 7, 2016, Total 2 pp.

Behrend, A. and T. Jorg, "Optimized Incremental ETL Jobs for Maintaining Data Warehouses", IDEAS10 2010, Aug. 16-18, Montreal, QC [Canada], © 2010 ACM, Total 9 pp.

Dessloch, S., M.A. Hernandez, R. Wisnesky, A. Radwan, and J. Zhou (Apr. 2008), Orchid: Integrating Schema Mapping and ETL, In Data Engineering, 2008. ICDE 2008. IEEE 24th International Conference on (pp. 1307-1316). IEEE, [Also, Total 10 pp.].

English Abstract for CN101828182A, published on Sep. 8, 2010, Total 2 pp.

U.S. Pat. No. 2009/0240663, dated Sep. 24, 2009, is an English language equivalent of CN101828182A, dated Sep. 8, 2010.

IBM Corporation, "IBM InfoSphere DataStage Balanced Optimization", Jun. 2008, © Copyright IBM Corporation 2008, Total 12 pp.

IBM, "Method to Optimize ETL Performance", May 2, 2005, IP.com No. 000124635, retrieved from the Internet at <URL: http://null/IPCOM/000124635>, Total 3 pp.

IP.com, "Optimizing of Workload of ETL Jobs Based on Resource Availability on Dependent Source, Target and ETL Infrastructure", Aug. 13, 2013, IP.com No. 000230005, retrieved from the Internet at <URL: http://null/IPCOM/000230005>, Total 7 pp.

Mell, P. and T. Grance, "The NIST Definition of Cloud Computing (Draft)", Jan. 2011, Computer Security Division Information Technology Laboratory National Institute of Standards and Technology, Total 7 pp.

Mell, P. and T. Grance, "Effectively and Securely Using the Cloud Computing Paradigm", [online], Oct. 7, 2009, retrieved from the Internet at <URL: htip://csrc.nist.gov/groups/SNS/cloud-computing/cloud-computing-v26.ppt>, Total 80 pp.

Smitsis, A., P. Vassiliadis, and T. Sellis, "Optimizing ETL Processes in Data Warehouses", Proceedings of the 21st International Conference on Data Engineering (ICDE 2005), © 2005 IEEE, Total 12 pp.

Yang, P., Liu, Z., & Ni, J. (Sep. 2013). Performance Tuning in Distributed Processing of ETL. In Internet Computing for Engineering and Science (ICICSE), 2013 Seventh International Conference on (pp. 85-88). IEEE. [Total 4 pgs.].

Office Action 1, dated Oct. 3, 2017, for U.S. Appl. No. 15/175,926, filed Jun. 7, 2016 by R.R. Dhayapule et al., Total 18 pp. [57.356C1 (OA1)].

Response to Office Action 1, dated Nov. 20, 2017, for U.S. Appl. No. 15/175,926, filed Jun. 7, 2016 by R.R. Dhayapule et al., Total 17 pp. [57.356C1 (ROA1)].

Final Office Action, dated Jan. 12, 2018, for U.S. Appl. No. 15/175,926, filed Jun. 7, 2016 by R.R. Dhayapule et al., Total 18 pp. [57.356C1 (FOA)].

Response to Final Office Action, dated Apr. 3, 2018, for U.S. Appl. No. 15/175,926, filed Jun. 7, 2016 by R.R. Dhayapule et al., Total 7 pp. [57.356C1 (RFOA)].

Notice of Allowance for U.S. Appl. No. 15/175,926, pp. 11, dated Jun. 29, 2018.

\* cited by examiner

| Origination | Destination | Average data transmisssion speed (MBytes/sec) | Unit cost |
|---|---|---|---|
| ETL Server1 | ETL Server 1 | 1000 | 1 |
| ETL Server1 | ETL Server 2 | 25 | 2 |
| ETL Server1 | ETL Server 3 | 25 | 2 |
| ETL Server2 | ETL Server 1 | 25 | 3 |
| ETL Server2 | ETL Server 2 | 100 | 2 |
| ETL Server2 | ETL Server 3 | 6 | 2 |
| ETL Server3 | ETL Server 1 | 25 | 2 |
| ETL Server3 | ETL Server 2 | 6 | 2 |
| ETL Server3 | ETL Server 3 | 100 | 1 |

| Table name | Data source name | Data Source | Estimated number of rows | Estimated row size (number of bytes) | Estimated data extraction/loading speed (MBytes/sec) |
|---|---|---|---|---|---|
| X1 | Data Source 2 | (localhost, ETLServer1, datasource2inst1,datasource2,user1,<pwd>) | 20M | 450 | 10 |
| X1 | Data Source 3 | (myhost2.mycloud.com, ETLServer2, datasource2inst2,datasource3,user2,<pwd>) | 20M | 450 | 10 |
| X1 | Data Source 5 | (myhost3.mycloud.com, ETLServer3, datasource2inst3,datasource5,user3,<pwd>) | 20M | 450 | 8 |
| X2 | Data Source 2 | (localhost, ETLServer1, datasource2inst1,datasource2,user1,<pwd>) | 10M | 760 | 10 |
| X3 | Data Source 3 | (myhost2.mycloud.com, ETLServer2, datasource2inst2,datasource3,user2,<pwd>) | 30M | 220 | 10 |
| Y1 | Data Source 1 | (localhost, ETLServer1, nzserver1,datasource1,user4,<pwd>) | 2M | 140 | 15 |
| Y1 | Data Source 4 | (myhost3.mycloud.com, ETLServer3, nzserver2,datasource4,user5,<pwd>) | 2M | 140 | 10 |
| Y2 | Data Source 4 | (myhost3.mycloud.com, ETLServer3, nzserver2,datasource4,user5,<pwd>) | 20K | 140 | 10 |
| Y3 | Data Source 1 | (localhost, ETLServer1, nzserver1,datasource1,user4,<pwd>) | 100M | 800 | 5 |

| Link Name | From stage | To stage | Mappings | Notes |
|---|---|---|---|---|
| link1 | X1_1 | Join_1 | ETLServer1 (network) | |
| | | | ETLServer2 | |
| | | | ETLServer3 | |
| link2 | X3 | Join_1 | ETLServer2 | |
| | | | ETLServer2 -> ETLServer1 | |
| | | | ETLServer2 -> ETLServer3 | |
| link3 | Y2 | Union | ETLServer3 | |
| | | | ETLServer3 -> ETLServer1 | |
| | | | ETLServer3 -> ETLServer2 | |
| link4 | Y1 | Union | ETLServer1 | Both ETLServer1 -> ETLServer3 and ETLServer3 -> ETLServer1 are excluded as both ETLServer1 and ETLServer3 already have Y1. |
| | | | ETLServer3 | |
| | | | ETLServer1 -> ETLServer2 | |
| | | | ETLServer3 -> ETLServer2 | |
| link5 | X1_2 | Join_2 | <same as mappings for link1> | |
| link6 | X2 | Join_2 | ETLServer1 | |
| | | | ETLServer1 -> ETLServer2 | |
| | | | ETLServer1 -> ETLServer3 | |
| link15 | Join_3 | Y3 | ETLServer1 | |
| | | | ETLServer2 -> ETLServer1 | |
| | | | ETLServer3 -> ETLServer1 | |

FIG. 10

| Stage Name | Estimated speed (Mbytes/sec) | Estimated size (Gbytes) | Estimated total time(Min) | Estimated total cost | Selectivity |
|---|---|---|---|---|---|
| X1_1 | 10 | 8.78 | 14.6 | 2 | n/a |
| X3 | 10 | 6.44 | 10.74 | 2 | n/a |
| Join_1 | 100 | 56.54 | 9.5 | 2 | 0.3 |
| Filter_1 | 100 | 56.54 | 9.5 | 2 | 0.1 |
| Aggregation_1 | 100 | ~25 | 4.2 | 2 | 0.1 |
| Y2 | 10 | 0.003 | 0.04 | 1 | n/a |
| Y1 | 15 | 0.27 | 0.3 | 1 | n/a |
| Union | 1000 | 0.3 | 0.005 | 1 | 1.0 |
| RemoveDuplicates | 1000 | 0.3 | 0.005 | 1 | 0.5 |
| X1_2 | 10 | 8.78 | 14.6 | 1 | n/a |
| X2 | 10 | 7.4 | 12.3 | 1 | n/a |
| Join_2 | 1000 | 65 | 1.1 | 1 | 0.3 |
| Filter_1 | 1000 | 65 | 1.1 | 1 | 0.1 |
| Aggregation_2 | 1000 | ~30 | 0.512 | 1 | 0.1 |
| Join_3 | 1000 | ~750 | 12.8 | 1 | 0.3 |

FIG. 11

| Link Name | Estimated speed (Mbytes/sec) | Estimated size (Gbytes) | Estimated total time(Min) | Estimated total cost |
|---|---|---|---|---|
| link1 | 100 | 8.78 | 1.5 | 2 |
| link2 | 100 | 6.44 | 1.1 | 2 |
| link3 | 25 | 0.003 | 0.001 | 2 |
| link4 | 1000 | 0.27 | 0.004 | 1 |
| link5 | 1000 | 8.78 | 0.15 | 1 |
| link6 | 1000 | 7.4 | 0.12 | 1 |
| link7 | 100 | 56 | 9.5 | 2 |
| link8 | 1000 | 0.3 | 0.004 | 1 |
| link9 | 1000 | 65 | 1.1 | 1 |
| link10 | 100 | ~25 | 4.2 | 2 |
| link11 | 1000 | 0.3 | 0.004 | 1 |
| link12 | 1000 | ~30 | 0.5 | 1 |
| link13 | 25 | ~25 | 17 | 3 |
| link14 | 1000 | ~30 | 0.5 | 1 |
| link15 | 1000 | ~750 | 12.8 | 1 |

DISTRIBUTED BALANCED OPTIMIZATION FOR AN EXTRACT, TRANSFORM, AND LOAD (ETL) JOB

FIELD

Embodiments of the invention relate to distributed balanced optimization for an Extract, Transform, and Load (ETL) job.

BACKGROUND

ETL jobs are designed to extract data from one or more database or non-database systems (called source systems), transform the data that is extracted based on business logic, and load the transformed data to one or more database or non-database systems (called target systems). The term "database tables" is used herein to represent database tables and non-database data that may be "mapped" to "sets of rows". For example, a Comma Separated Values (CSV) file may be mapped to a table, where each comma separated field in a line in the CSV file is mapped to a table column value, and the whole line is mapped to a row in the mapped table.

A traditional ETL tool executes the ETL jobs on a local machine (where a machine is a computing system) that may access one more local or remote source systems. The source and target databases may not reside on the same physical machines as the ETL tool (i.e., on the local machine). While running the ETL job, the ETL tool connects to the database that may be hosted on a remote machine over a network and extracts the data to the local machine, transforms the data locally, and loads the transformed data to the target database that is located on another remote machine in the network.

The data that the ETL job processes has been growing rapidly. In a large enterprise, there may be hundreds of such ETL jobs running in parallel. When the source or target data is present on some other location (e.g., a cloud system), it may take a large amount of time to fetch the data to the local machine and then load the transformed data back to the cloud. This increases the completion time of the ETL job and also increases the load on the local machine executing the ETL job. This may result in, for example, network timeout, ETL jobs crashing because of lack of memory, an ETL job hanging or running forever, network congestion, etc.

SUMMARY

Provided is a method for distributed balanced optimization for an Extract, Transform, and Load (ETL) job across distributed systems of participating ETL servers. The method comprises: receiving a data flow graph with links and stages for an ETL job to be executed by participating ETL servers; generating a distributed job execution plan that breaks the data flow graph into job segments that each include a subset of the links and stages and map to one participating ETL server from the distributed system to meet an optimization criteria across the distributed systems, wherein the distributed job execution plan utilizes statistics to reduce data movement and redundancies and to balance workloads across the distributed systems; and distributing each of the job segments to the participating ETL servers based on the mappings for parallel execution.

Provided is a computer program product for distributed balanced optimization for an Extract, Transform, and Load (ETL) job across distributed systems of participating ETL servers. The computer program product comprises a computer readable storage medium having program code embodied therewith, the program code executable by at least one processor to perform: receiving a data flow graph with links and stages for an ETL job to be executed by participating ETL servers; generating a distributed job execution plan that breaks the data flow graph into job segments that each include a subset of the links and stages and map to one participating ETL server from the distributed system to meet an optimization criteria across the distributed systems, wherein the distributed job execution plan utilizes statistics to reduce data movement and redundancies and to balance workloads across the distributed systems; and distributing each of the job segments to the participating ETL servers based on the mappings for parallel execution.

Provided is a computer system for distributed balanced optimization for an Extract, Transform, and Load (ETL) job across distributed systems of participating ETL servers. The computer system comprising: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: receiving a data flow graph with links and stages for an ETL job to be executed by participating ETL servers; generating a distributed job execution plan that breaks the data flow graph into job segments that each include a subset of the links and stages and map to one participating ETL server from the distributed systems to meet an optimization criteria across the distributed systems, wherein the distributed job execution plan utilizes statistics to reduce data movement and redundancies and to balance workloads across the distributed systems; and distributing each of the job segments to the participating ETL servers based on the mappings for parallel execution

BRIEF DESCRIPTION OF THE SEVERAL VIEWS OF THE DRAWINGS

Referring now to the drawings in which like reference numbers represent corresponding parts throughout:

FIG. 6 illustrates a data source metrics table with data table statistics in accordance with certain embodiments.

FIG. 10 illustrates a link mappings table in accordance with certain embodiments.

FIG. 11 illustrates a table with estimated speeds for stages with respect to execution plan P1 in accordance with certain embodiments.

FIG. 12 illustrates a table with estimated speeds for links with respect to execution plan P1 in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
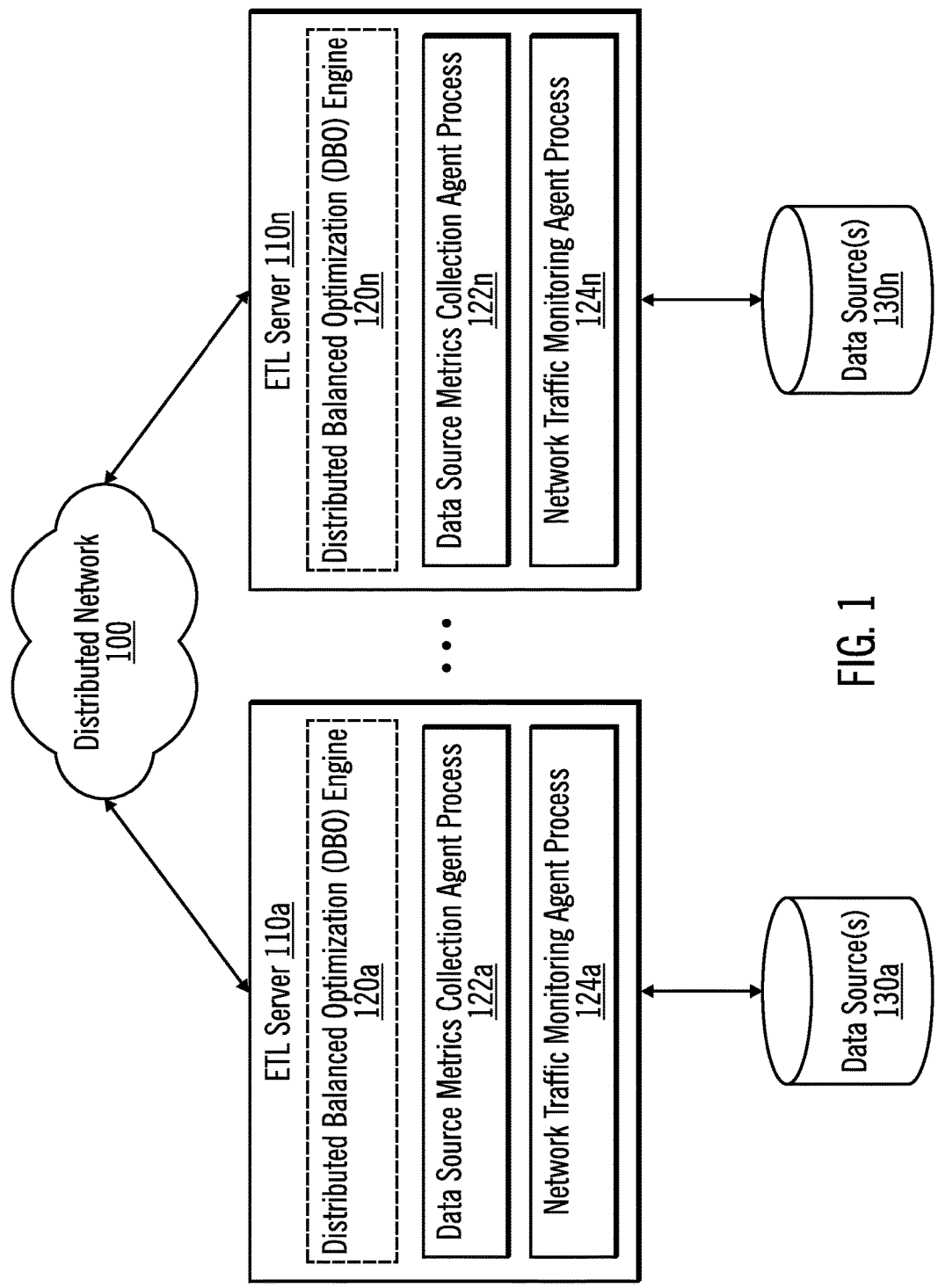
FIG. 1 illustrates, in a block diagram, a distributed computing environment in accordance with certain embodiments.

FIG. 1 illustrates, in a block diagram, a distributed computing environment in accordance with certain embodiments. In FIG. 1, multiple ETL servers 110a . . . 110n coupled to a distributed network (e.g., a cloud, a local network, an intranet, the internet, etc.). The ellipses indicated that there may be any number of ETL servers 110a . . . 110n. One or more of the ETL servers 110a . . . 110n includes a Distributed Balanced Optimization (DBO) engine 120a . . . 120n, a data source metrics collection agent process 122a . . . 122n (which will be referred to herein as "DMA process"), and a network traffic monitoring agent process 124a . . . 124n, respectively. Each of the ETL servers 110a . . . 110n is coupled to one or more data sources. For example, one or more data sources 130a are coupled to ETL server 110a, and one or more data sources 130n are coupled to ETL server 130n. Any of the data sources 130a . . . 130n may be a source data source or a target data source for different ETL jobs. In certain embodiments, the data sources are databases ("DBs").

The DBO engine 120a . . . 120n optimizes data processing of the ETL job by providing distributed balanced optimization to move data processing closer to the source data source and the target data source.

Embodiments have several instances of ETL servers deployed in different locations (e.g., one on the cloud and one on premises of a business) and extend the balanced optimization concept to push an ETL job or portions of an ETL job to ETL server instances deployed on other machines (e.g., on the cloud).

Embodiments achieve distributed balanced optimization for an ETL job and distribute the workload to optimal ETL servers for processing in a distributed network of ETL servers based on certain defined workload distribution rules.

Embodiments achieve distributed balanced optimization for an ETL job and distribute the workload to several different ETL servers based on certain well defined criteria, such as locality of the data, load on the source and target data sources, etc. Embodiments create a new balanced optimization pattern that pushes the workload to other ETL instances on other machines (e.g., on the cloud). That is, ETL job processing is delegated to an ETL instance that is considered optimal based on the defined criteria. Embodiments maintain a centralized data source registry that stores metadata about data sources and their stored tables and files. Embodiments create "virtual" local data source table names ("virtual table names") and a new data source and a workload mapping table that maps the virtual table names to one or more tables or table partitions on remote ETL instances. Herein, the term "tables" is used to include "table partitions", as well. For example, a table may be split into 4 partitions that reside on different source systems. For the purpose of data extraction and processing that involve all four partitions, a candidate execution plan may generate additional source system stages and a "partition aggregation" stage to account for all distributed table partitions and to combine the loaded partitions for subsequent processing stages in the job. With embodiments, the data source/workload mapping tables are automatically derived based on locality and server load information previously obtained from the participating ETL instances. If desired, the automatically generated data source/workload mapping tables may be manually updated by users to take into consideration environment changes and/or operational preferences. With embodiments, based on the data source/workload mapping table, the data source and connection information in the original job may be replaced in order to redirect the workload to be processed at designated ETL instances. The workload of each participating ETL server, source data source machine, and target data source machine may also be added to the data source registry. This will be useful in selecting an execution plan that does not exceed the target ETL server capacity.

ETL jobs provide connectivity, data manipulation functionality, and highly scalable performance. In a typical ETL job, data is extracted from a data source, transformed, and then loaded into a target data store. With embodiments, parallel ETL processing maximizes computation capability of the hardware on the local and remote machines by providing both parallel I/O and transformation.

Extract, Load, and Transform (ELT), which is also referred to as Pushed-Down Optimization (PDO), works by pushing the transform operations from the ETL server to a target data store. There are different variations of the ELT approach in terms of pushing the entire transform operations versus a portion of the transform operations to the target data store.

In the case that both source and target data reside in the same data store, data extraction and load operations in an ETL job may still incur network traffic as data are sent to/from the data store and from/to the ETL server. The incurred network traffic increases as the size of the extracted data increases.

In many cases, the computation power/capacity of the data store may be superior to and/or more available than the computation power/capacity of the ETL server.

Embodiments provide balanced optimization the transforms an ETL job into an ELT job based on some configurable criteria, such as the selection of the source data store versus the target data store for the push down.

With balanced optimization, the ETL job is transformed based on criteria, including:

1) Push data processing to the target data source. In this case, data transformation happens mainly in the target data source. Data is extracted from source data sources, and transformed mainly in the target data source after loading the data into the target data source. In the case that both source and target data sources reside in the same ETL server, the extraction, transformation, and load may be executed in the target ETL server.

2) Push data processing to the source data source. In this case, data transformation happens mainly in the source data source. The transformed data is then extracted. Additional transformations (that cannot be processed in the source data source) may be applied to the extracted data as appropriate. Finally, the completely transformed data is loaded to the target data source. In the case that both source and target data sources reside in the same ETL server, the extraction, transformation and load may be executed in the source ETL server.

In certain embodiments, every data source table involved may need to be "entirely" accessible from the local ETL server. In a distributed network or isolated local subnets, some data may only be accessible to a particular ETL server. In general, balanced optimization stops at the boundary of a computing environment defined by the data accessibility of the underlying ETL server.

Embodiments extend balanced optimization across a distributed or local network of autonomous ETL servers (on respective host systems) in order to minimize the total job execution cost and/or job execution time. An ETL job modeled by a data flow graph consists of "stages" interconnected by "links". "Data source" stages represent conduits to/from data sources, and "computation" stages carry out data transformation processing. Links are data transmission channels. With embodiments, a data flow graph may be dynamically transformed into "distributed job segments", each assigned to an ETL server in the network based on cost and speed metrics, that can be collected from participating ETL servers, using distributed balanced optimization. The execution of the whole ETL job may then be jointly carried out by the participating ETL servers in the network.

In certain embodiments, the distributed balanced optimization transforms the ETL job into one or more optimized job segments based on the minimum total job execution cost and/or total job execution time. The generated optimized job segments form a distributed job execution plan. The total job execution cost and execution time may be calculated using an estimated size of the source data and intermediate data, unit cost and speed of data extraction/loading from/to the data sources, unit cost and speed of the projected data transmission on the communication channels in between ETL servers, unit cost and speed of the computational stages on each ETL server, and the accessibility of a data source from each ETL server. These job segments are submitted to their corresponding target ETL servers by the originating ETL server through a distributed job orchestrating mechanism.

Merely to enhance understanding of embodiments, an example of how an ETL job represented as a data flow graph may be optimized into three job segments and dispatched to three different ETL servers, including the initiating ETL server for execution will be provided. In this example, tables are distributed and accessible by specific ETL servers in the distributed network. All the ETL servers in the distributed network that are collaborating with each other for the purpose of distributed ETL job execution are called "participating ETL servers". In some cases, multiple copies of the same table are available and accessible by multiple participating ETL servers in the distributed network. In other cases, some tables may be accessible through a particular ETL server.

Figure 2:
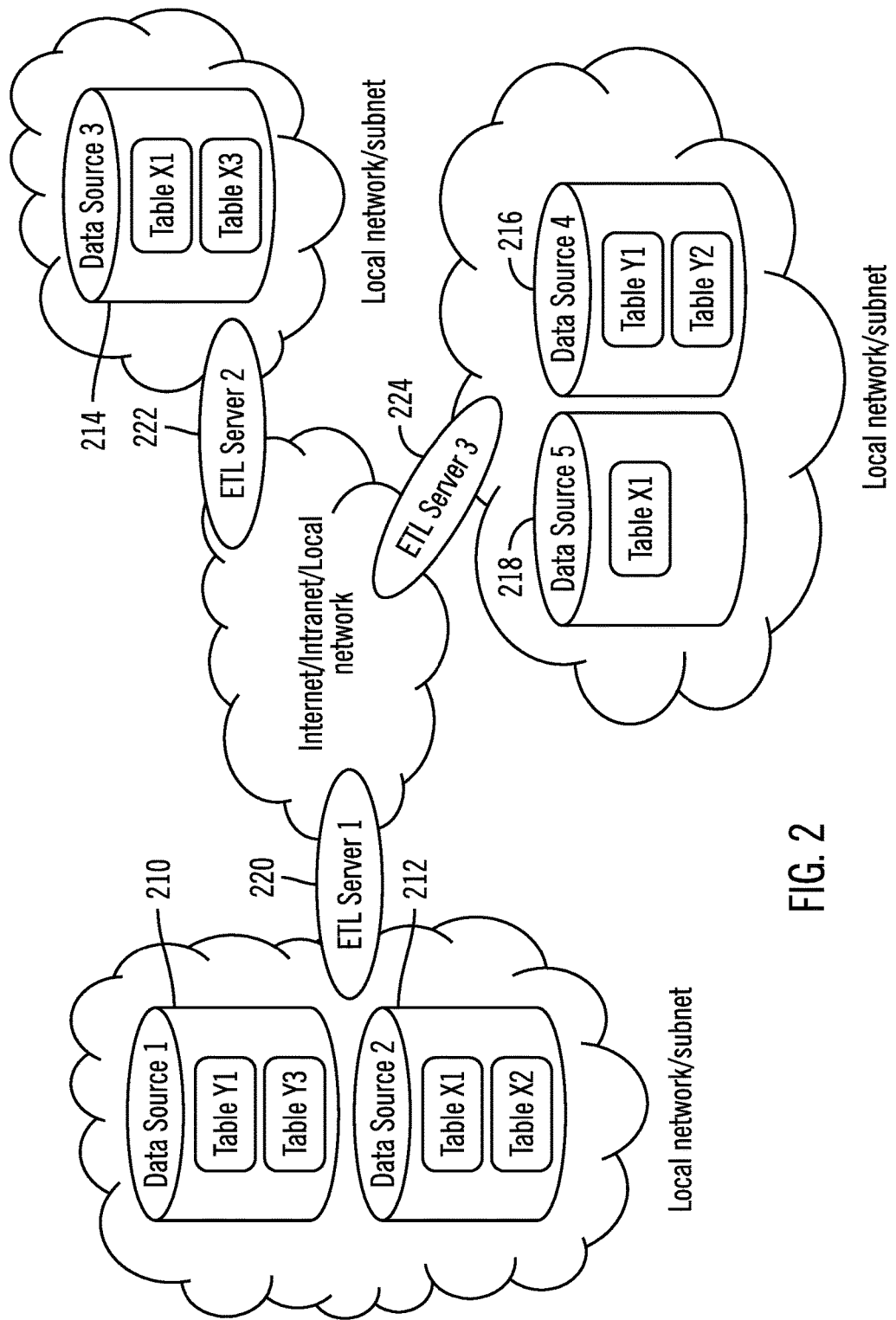
FIG. 2 illustrates a distributed network with three participating ETL servers in accordance with certain embodiments.

For this example, FIG. 2 illustrates a distributed network 200 with three participating ETL servers in accordance with certain embodiments. ETL server 1 220 is coupled to data source 1 210 and data source 2 212, which may be in a local network or a subnet. ETL server 2 222 is coupled to data source 3 214, which may be in a local network or a subnet. ETL server 3 224 is coupled to data source 4 216 and data source 5 218, which may be in a local network or a subnet. ETL server 1 220, ETL server 2 222, and ETL server 3 224 may be coupled to each other via, for example, the Internet, an intranet or a local network.

Figure 3:
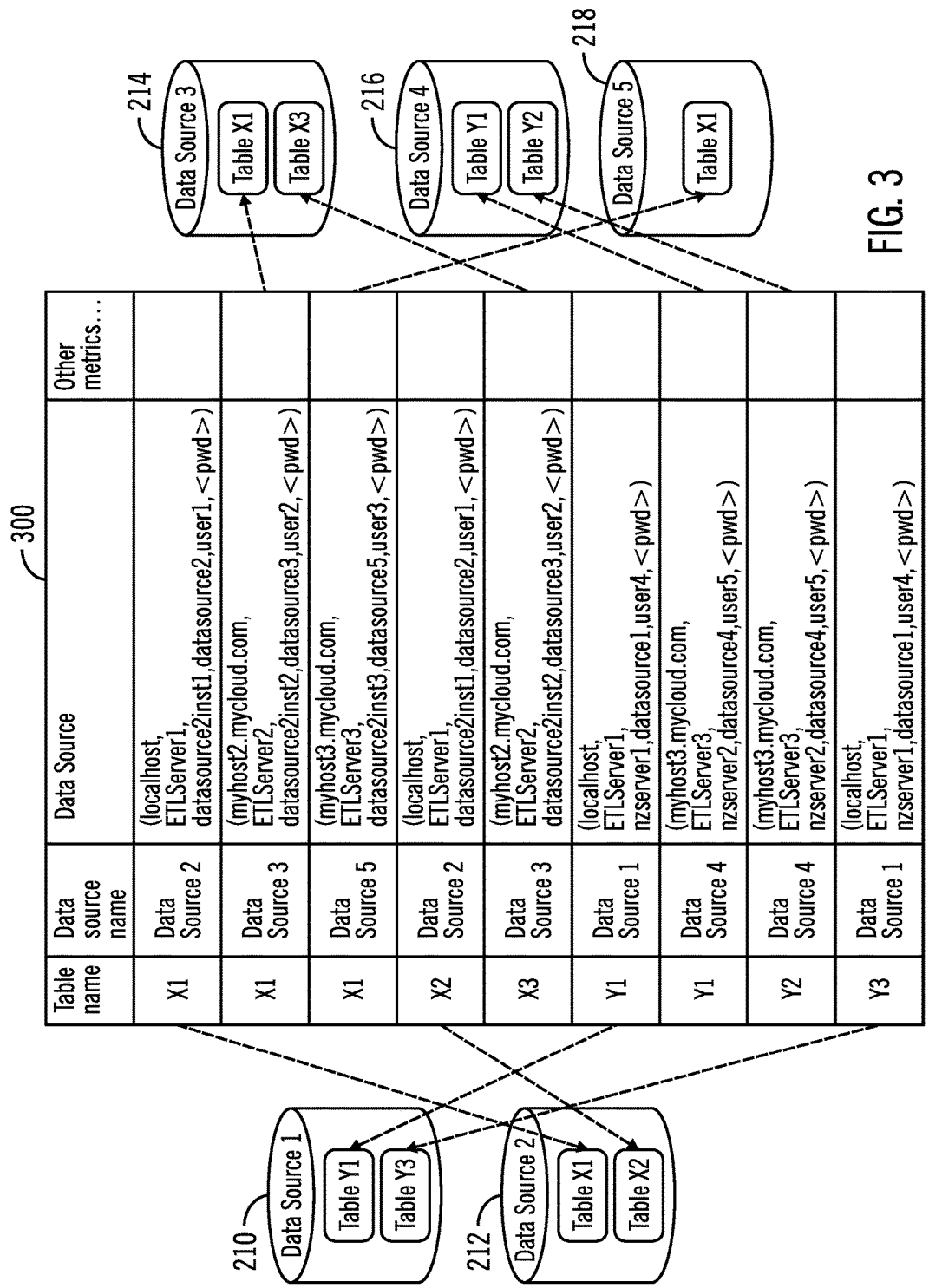
FIG. 3 illustrates a data source metrics table with data source mappings in accordance with certain embodiments.

Continuing with the example, FIG. 3 illustrates a data source metrics table 300 with data source mappings in accordance with certain embodiments. Data source mappings provide information as to which ETL servers in the distributed network have access to which tables. In this example, ETL server 220 1 has access to a copy of table X1, table X2, table Y1 and table Y3; ETL server 2 222 has access to a copy of table X1 and table X3; and ETL server 3 224 has access to a copy of table X1, table Y1, and table Y2.

Figure 4:
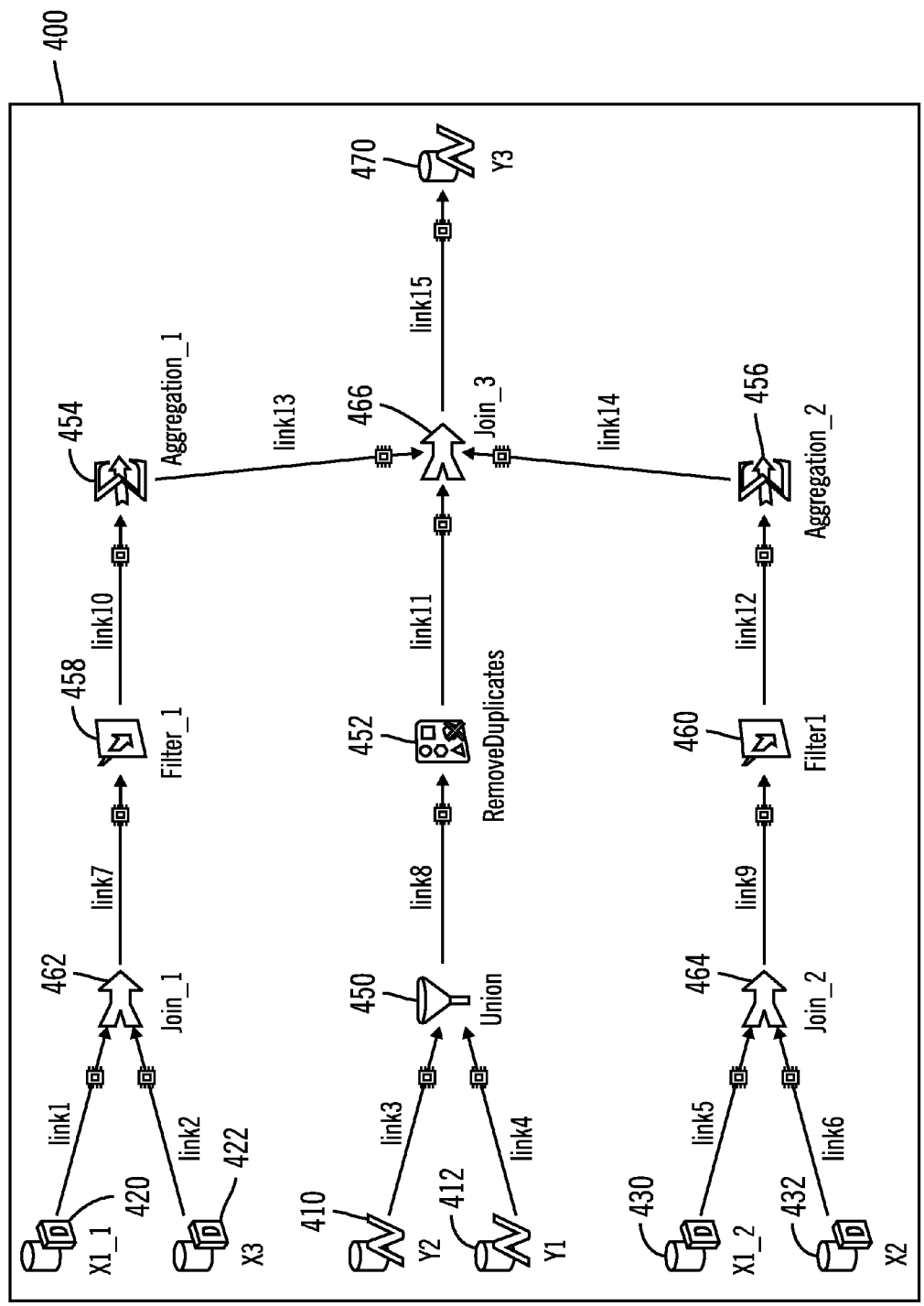
FIG. 4 illustrates a data flow graph for an ETL job in accordance with certain embodiments.

FIG. 4 illustrates a data flow graph 400 for an ETL job in accordance with certain embodiments. In this example, each icon represents a stage (e.g., a data source stage or a computation stage), while a directed line represents a link. The arrow on each line points to the direction of the data flow. Each data source stage (a leaf node in the data flow graph 400) is associated with a table name. For example, in stage Y2 410, table Y2 is extracted, and in stage Y1 412, table Y1 is extracted. Both stage X1_1 420 and stage X1_2 430 refer to the same table X1. Also, in stage X3 422, table X3 is extracted. In stage X2 432, table X2 is extracted.

In certain embodiments, stage names are unique. The Union stage 450 performs the SQL union operation. The RemoveDuplicates stage 452 removes duplicate rows (identified by keys in tables Y1 and Y2). The two Aggregation stages 454, 456 aggregate the incoming data rows based on some aggregation columns. The two Filter stages 458, 460 filter out unwanted rows based on the result of evaluating a filtering expression defined in each stage. Each of the three Join stages 462, 464, 466 performs a SQL join operation on the rows in its incoming links Finally, all the processed data rows are written to the table Y3 in stage Y3 470.

In FIG. 4, rows from table X1_1 and table X3 are joined in Join_1 stage 462, the joined rows are filtered in Filter_1 stage 458, and the filtered rows are aggregated in Aggregation_1 stage 454, with the aggregated rows being sent to Join_3 stage 466. Also, in FIG. 4, rows from table Y2 and table Y1 are merged in Union stage 450, duplicate rows are removed in RemoveDuplicates stage 452, and these rows are sent to Join_3 stage 466. In FIG. 4, rows from table X1_2 and X2 are joined in Join_2 stage 464, the joined rows are filtered in Filter1 stage 460, and the filtered rows are aggregated in Aggregation_2 stage 456, with the aggregated rows being sent to Join_3 stage 466. In Join_3 stage 466, the received rows are joined and written to table Y3 in stage Y3 470.

With embodiments, the DMA process collects data source metrics for each data source through all the participating ETL servers, including the local ETL server itself. The collected data source metrics include information such as: data source mappings and data table statistics.

Embodiments provide a new ETL network stage that may serve as an input stage (a stage with one output link and no input links) or an output stage (a stage with one input link and no output links). The ETL network stage is responsible for the following operations:

for output stages, sending data and control signals to ETL network stages on other ETL servers; and for input stages, receiving data and control signals from ETL network stages on other ETL servers.

In certain embodiments, the ETL network stage for data communication between job segments on different servers may be implemented as a custom operator in the parallel framework provide by embodiments.

The network traffic monitoring agent process may be run periodically to collect network performance metrics.

Figure 5:
FIG. 5 illustrates a network metrics table in accordance with certain embodiments.

FIG. 5 illustrates a network metrics table 500 in accordance with certain embodiments. The network metrics table 500 contains metrics collected by the network traffic monitoring agent process, where the unit costs may be pre-assigned based on network configurations. For each ETL server path, the cost column records the relative unit cost of data transmission over the particular network. which is often determined by the type of the network (e.g., private, leased, public, etc.).

FIG. 6 illustrates a data source metrics table 600 with data table statistics in accordance with certain embodiments. The data source metrics table 600 contains data table statistics collected by the DMA process. For a particular table in a particular data source accessed by a particular ETL server, the data source metrics table 600 includes an estimated number of rows in the table, an estimated row size for the table, and an estimated data extraction and loading speed.

Given a data flow graph for an ETL job, the DBO engine 120a . . . 120n generates a distributed job execution plan. In certain embodiments, the distributed job execution plan consists of one or multiple job segments that are determined based on the stage and link mappings of the data flow graph for the ETL job. The stages and links in a particular job segment are mapped to a same ETL server, and any link connecting two segments (also called "network links") are mapped to a distributed network path. For each job segment, every inbound network link is replaced by an input ETL network stage represented by an icon with an inbound arrow, and every outbound network link is replaced by an output ETL network stage represented by an icon with an outbound arrow. The result is a valid local ETL job that may be executed by the target ETL server.

Figure 7:
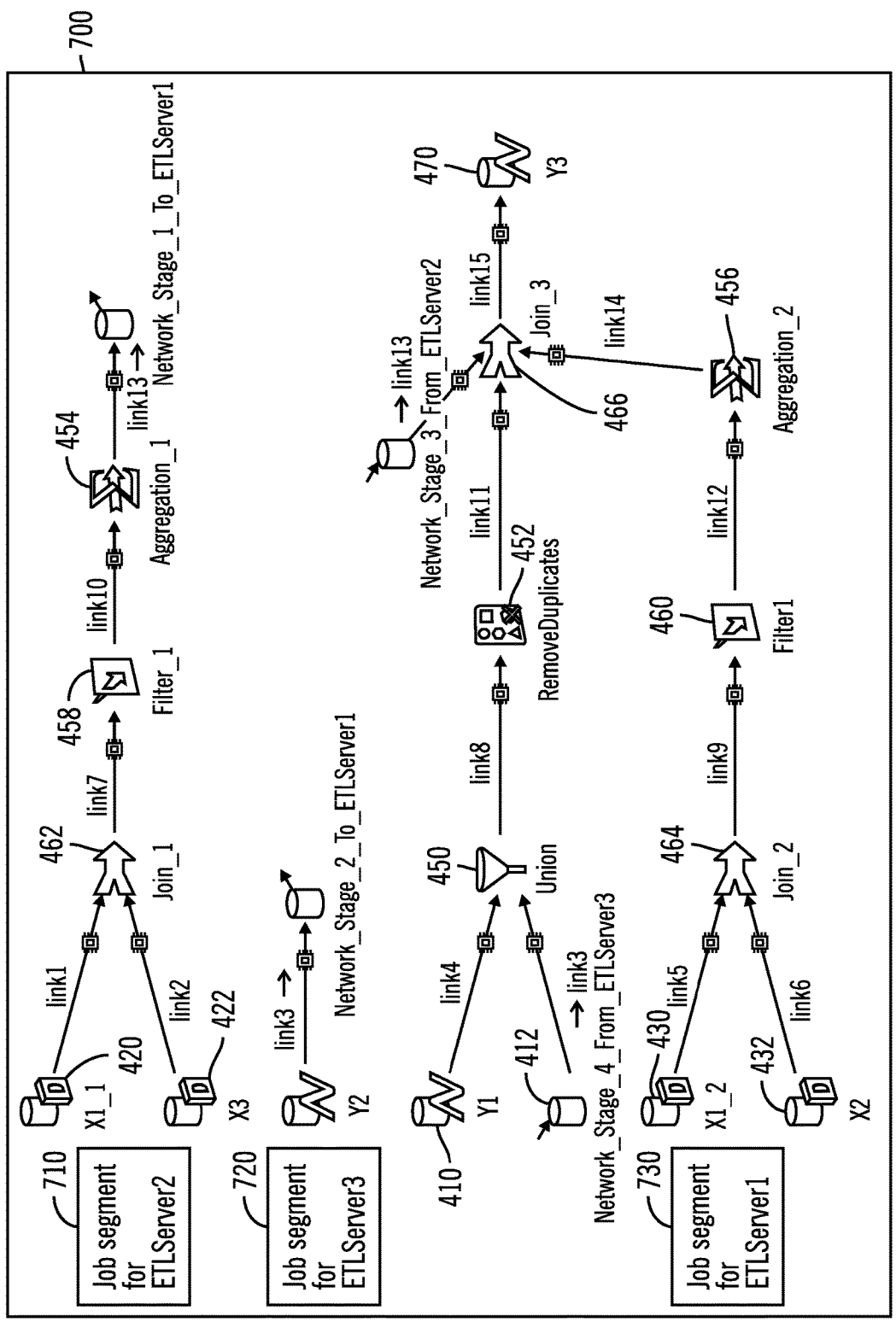
FIG. 7 illustrates a distributed job execution plan P1 in accordance with certain embodiments.

FIG. 7 illustrates a distributed job execution plan P1 700 in accordance with certain embodiments. The distributed job execution plan P1 700 has three job segments: a job segment 710 for ETL server 2 222, a job segment 720 for ETL server 3 224, and a job segment 730 for ETL server 1 220 that has been generated from the data flow graph for an ETL job in FIG. 4. The three job segments are submitted to their corresponding target ETL servers by the originating ETL server through a distributed orchestrating mechanism, i.e., the job segments 710, 720 and 730 are submitted to ETL server 2 222, ETL server 3 224 and ETL server 1 220, respectively. With embodiments, these three job segments continue to run in parallel in the three ETL servers.

In job segment 710, the rows are extracted from table X1_1 and table X3, the extracted rows are joined in Join_1 stage 462, the joined rows are filtered in Filter_1 stage 458, and the filtered rows are aggregated in Aggregation_1 stage 454, and, finally the aggregated rows are sent to ETL server 1 220 via the outbound network stage Network_Stage_1_To_ETLServer1.

In job segment 720, the rows are extracted from table Y2 and the extracted rows are sent to ETL server 1 220 via the outbound network stage Network_Stage_2_To_ETLServer1.

In job segment 730, the rows are extracted from table Y1 and the inbound network stage Network_Stage_4_From_ETLServer3 reads the incoming data/rows from ETL server 3 224, and, if the data is not yet available, then the inbound network stage waits till the data is available and then reads the incoming data. The rows from table Y1 and the incoming rows from ETL server 3 224 are merged in Union stage 450, duplicate rows are removed in Remove-Duplicates stage 452, and these rows are sent to Join_3 stage 466. Also, (in some embodiments at the same time) the other inbound network stage Network_Stage_3_From_ETLServer2 in job segment 730 reads the incoming network data from ETL server 1 220, waiting till the data is available, and sends the data to Join_3 stage 466.

Moreover, in job segment 730, rows from table X1_2 and X2 are joined in Join_2 stage 464, the joined rows are filtered in Filter1 stage 460, and the filtered rows are aggregated in Aggregation_2 stage 456, with the aggregated rows being sent to Join_3 stage 466. In Join_3 stage 466, the received rows are joined and written to table Y3 in stage Y3 470.

Figure 8:
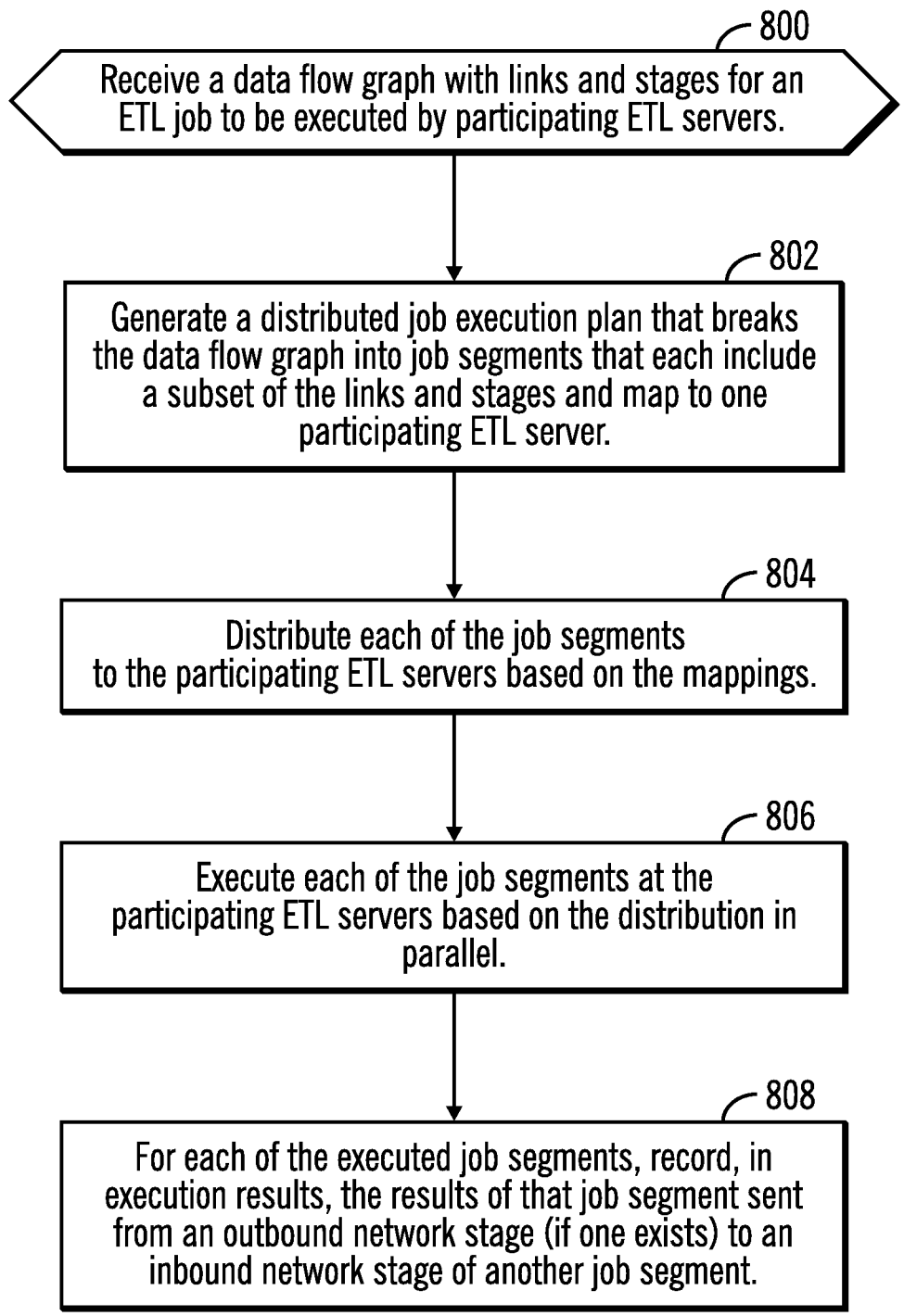
FIG. 8 illustrates, in a flowchart, operations performed to execute an ETL job in accordance with certain embodiments.

FIG. 8 illustrates, in a flowchart, operations performed by the DBO engine 120a . . . 120n to execute an ETL job in accordance with certain embodiments. Control begins at block 800 with the DBO engine 120a . . . 120n receiving a data flow graph with links and stages for an ETL job to be executed by participating ETL servers. In block 802, the DBO engine 120a . . . 120n generates a distributed job execution plan that breaks the data flow graph into job segments that each include a subset of the links and stages and map to one participating ETL server. In block 804, the DBO engine 120a . . . 120n distributes each of the job segments to the participating ETL servers based on the mappings. In block 806, the DBO engine 120a . . . 120n executes each of the job segments at the participating ETL servers based on the distribution in parallel. In block 808, for each of the executed job segments, the DBO engine 120a . . . 120n records, in the execution results, the results of a job segment sent from an outbound network stage (if one exists) to an inbound network stage of another job segment. The outbound network stages may run in parallel, whenever possible. In certain embodiments, the results of executed job segments are not statically "combined", rather the results of the job segments "flow" through the distributed job segments using the inbound/outbound network stages when crossing from one ETL server to another ETL server (e.g., when crossing ETL server boundaries).

In certain embodiments, the DBO engine 120a . . . 120n finds multiple distributed job execution plans and selects a distributed job execution plan from these that satisfies selected optimization criteria, such as "minimum time", "minimum cost" or something in between: "minimum time within a set maximum cost" and "minimum cost with a set maximum time". For minimum time, one of the distributed job execution plans with minimum estimated total execution time will be selected. For minimum cost, one of the distributed job execution plans with minimum estimated total cost will be selected. For minimum time within a set maximum cost, one of the distributed job execution plans with minimum estimated total execution time among all the distributed job execution plans with a cost that is less than or equal to the set maximum cost will be selected. For minimum cost with a set maximum time, one of the distributed job execution plans with minimum estimated total cost among all the distributed job execution plans with an estimated total execution time that is less than or equal to the set maximum time.

In conjunction with the selected optimization criteria, there may also be a selected optimization level that determines the scope of a search space for the distributed job execution plan. The available optimization levels include "exhausted", "depth-first limited N", and "breadth-first limited N".

For exhausted, the search space consists of all the legitimate combinations of all the available link mappings. For large jobs, the exhausted optimization level may require a long search time based on the number of combinations. The exhausted search may use depth-first search or breadth-first search.

For depth-first limited N, the search space consists of the first N number of execution plans in the depth-first search.

For breadth-first limited N, the search space is limited to the first N number of combinations in each breadth level in the breadth-first search. All the combinations following the Nth combination in each level are pruned from the search space.

Figure 9:
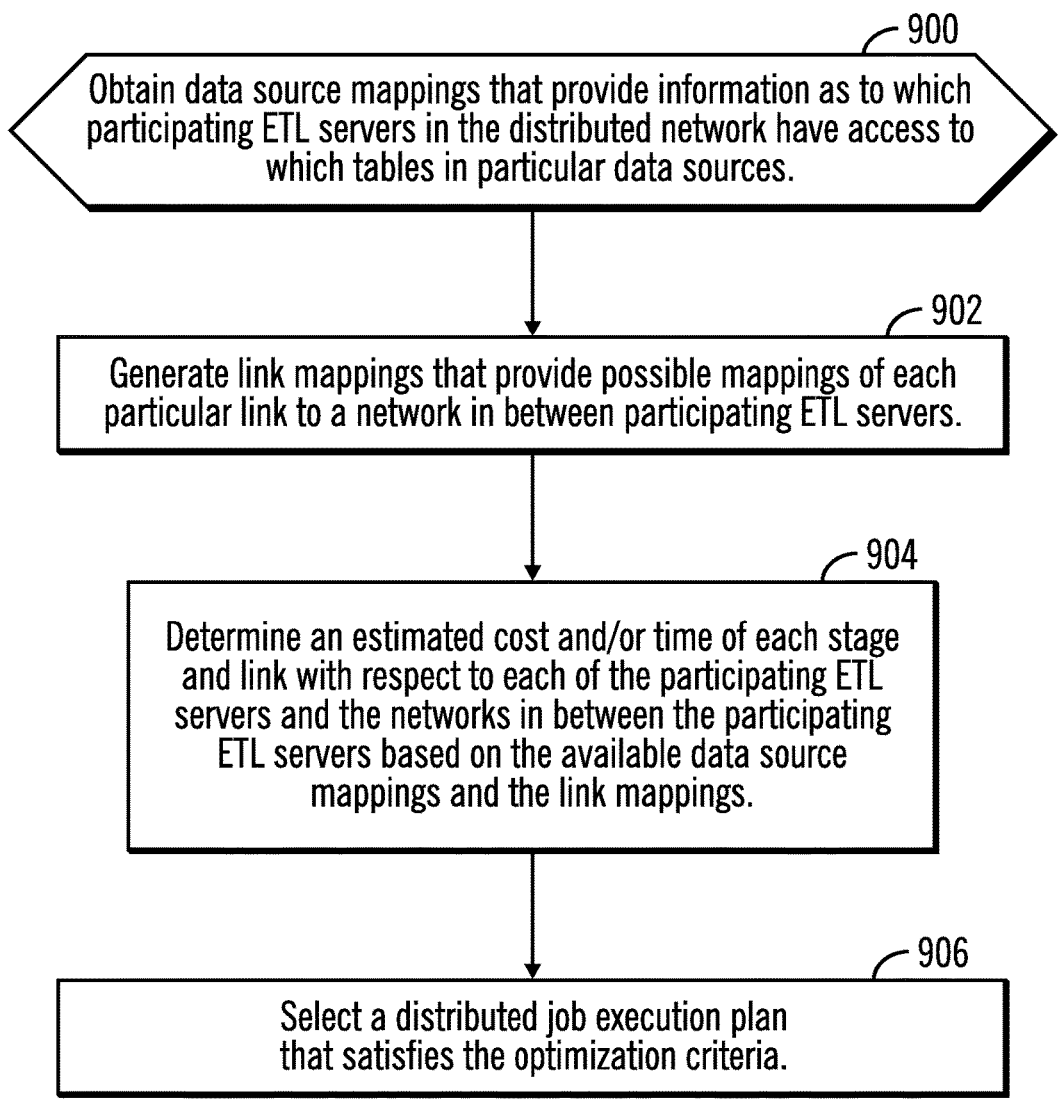
FIG. 9 illustrates, in a flowchart, operations performed to select an optimized distributed execution plan in accordance with certain embodiments.

FIG. 9 illustrates, in a flowchart, operations performed by the DBO engine 120a . . . 120n to select an optimized distributed execution plan in accordance with certain embodiments. Control begins at block 900 (block 900 corresponds to FIGS. 3 and 5) with the DBO engine 120a . . . 120n obtaining data source mappings that provide information as to which participating ETL servers in the distributed network have access to which tables in particular data sources.

In block 902 (block 902 corresponds to FIG. 10), the DBO engine 120a . . . 120n generates link mappings that provide possible mappings of each particular link to a network in between participating ETL servers. In certain embodiments, the DBO engine 120a . . . 120n generates link mappings in a link mappings table that lists possible mappings of each particular link to a local network or distributed network in between participating ETL servers. This sets the initial scope of the search space based on the data sources accessible from each participating ETL server.

In block 904 (block 904 corresponds to FIGS. 11 and 12), the DBO engine 120a . . . 120n determines an estimated cost and/or time of each stage and link with respect to each of the participating ETL servers and the networks in between the participating ETL servers based on the available data source mappings and link mappings. For the "minimum time" optimization criteria, the DBO engine 120a . . . 120n calculates the estimated total execution time. For the "minimum cost" optimization criteria, the DBO engine 120a . . . 120n calculates the estimated total cost. For the remaining optimization criteria, both estimated cost and time are calculated. The DBO engine 120a . . . 120n also utilizes the server workload information and selects the execution plan that does not exceed the target ETL server capacity. A new workload option may be added either at job level or at server level, and, when this option is turned on, the optimization criteria will only consider candidate execution plans that do not exceed the capacity of every ETL server to which a job segment is assigned. In various embodiments, the workload option may be added to the ETL job (i.e., the data flow graph) or added globally at the ETL server level (this means that the option is applicable for all the jobs located in the ETL server).

In block 906, the DBO engine 120a . . . 120n selects a distributed job execution plan that satisfies the optimization criteria. In this manner, the DBO engine 120a . . . 120n fine tunes the search space based on the selected optimization level. In certain embodiments, the first distributed job execution plan that satisfies the optimization criteria will be selected.

FIG. 10 illustrates a link mappings table 1000 in accordance with certain embodiments. The link mappings table 1000 provides the complete link mappings for all links originating from data source stages or going into data source stages. In certain embodiments, the link mappings for data source stages are determined based on the accessible data sources from each ETL server. For example, since table Y2 only exists in data source 4 214, which is only accessible by ETLServer3, link3 is mapped to one of the following: "Local network of ETLServer3", "distributed network from ETLServer3 to ETLServer1" or "distributed network from ETLServer3 to ETLServer2". Similarly, linkl5 may only be mapped to one of the following: "Local network of ETLServer1", "distributed network from ETLServer2 to ETLServer1" or "distributed network from ETLSever3 to ETLServer1".

The set of possible mappings for each link, say L1, is denoted as mappings(L1). For example, mappings('link3')= {'ETLServer3', 'ETLServer3-ETLServer1', 'ETLServer3-ETLServer2'}. For each link L2 in between two processing stages, mappings(L2) is initially the complete set of all possible mappings.

In certain embodiments, stage mappings are automatically determined once the link mappings are selected in the job execution plan search process. For example, if the input link of a stage is mapped to "ETLServerN" or "ETLServerM-ETLServerN", then the stage is mapped to "ETLServerN". This would also imply that the output link of the stage is mapped to either "ETLServerN" or "ETLServerN-ETLServerK".

Throughout the document, the notation mapping(X,P1) is used to represent the mapping of X, a stage or link, in a distributed job execution plan P1.

With reference to estimating unit cost and speed, each stage and link is assigned two numbers that represent the estimated unit cost and speed of moving (in the case of a link) or processing (in the case of a stage) the incoming data rows in a particular ETL server or network (and its inbound and outbound network channels), respectively. For example, the unit cost of extracting data table X1 from data source 2 212 may be cheaper than the unit cost of extracting data table X1 from data source 3 214 due to that ETLServer2 being a leased cloud instance, while moving X1 from ETLServer1 to ETLServer2 might be slower than moving X1 from ETLServer2 to ETLServer1 due to the distributed network configurations.

These estimated unit cost and speed are periodically recalculated based on the metrics collected over the network. In the following, a unit cost function unitcost( ) and a speed function speed( ) are used to represent the two numbers assigned to each stage and link in a particular environment or network. For example, cost('X1', 'ETLServer1') is the estimated unit cost of running stage X1 in ETLServer1, and speed('link1', 'ETLServer1-ETLServer2') is the estimated unit data transmission speed from ETLServer1 to ETLServer2. Note that, in the case both stages of a link are mapped to a single ETL server, the link is called a local link. The speed function of a local link is the data transmission speed within the local network, and the cost function of a local link is tied to the unit cost of running a job in the local ETL server, the size of the data to move, and the amount of memory and disk buffers used in the inter-stage communication protocol. Normally the cost function for a local link may be simplified to a fixed unit cost plus a number that is proportional to the size of the incoming data.

The data source metrics table 600 of FIG. 6 shows an estimated number of rows in the table, an estimated row size for the table, and an estimated data extraction and loading speed. In certain embodiments, the estimated data size for each table is the multiplication of the estimated row size and the estimated number of rows for that table.

In certain embodiments, the estimated data size calculation is independent of the stage/link mappings. However, the estimated speed calculation for processing stages depends on the performance of each individual ETL server. The actual estimates may be based on empirical performance data of the individual ETL server instance in its own environment. FIG. 11 illustrates a table 1100 with estimated speeds for stages with respect to execution plan P1 in accordance with certain embodiments. Table 1100 includes, for a particular stage, an estimated speed of data transmission, an estimated size of data, an estimated total time for processing, an estimated total cost for processing, and selectivity. FIG. 12 illustrates a table 1200 with estimated speeds for links with respect to execution plan P1 in accordance with certain embodiments. Table 1100 includes, for a particular link, an estimated speed of data transmission, an estimated size of data, an estimated total time for processing, and an estimated total cost for processing. FIGS. 11 and 12 show some default numbers merely for use in this example.

In general, the estimated speed of a link or stage, X, with respect to a specific distributed job execution plan P1 is denoted by speed(X,P1), while the corresponding estimated data size is denoted by size(X,P1).

With reference to calculating an estimated size for links connecting two processing stages, the estimated size calculation for processing stages S1 is based on the estimated "selectivity" of S1 (or selectivity(S1), meaning the ratio of the size of the output data versus the size of the input data). In certain embodiments, some default numbers may be assigned to each type of processing stage. In certain embodiments, more accurate estimates are used. If empirical data is available, the empirical data may be used by the DBO engine 120*a* . . . 120*n* for a more accurate result.

The estimated size for a processing stage, StageX, is the estimated size of its input data, say S1. The estimated size for an output link of StageX=S1*selectivity(StageX).

For a given distributed job execution plan P1, the estimated total execution time is the sum of the estimated execution time for each stage and link as follows:

time(P1)=Sum of all time(X, P1) for every stage and link X in the ETL job, where time(X, P1)=speed(X, P1)*size(X, P1)

For a given distributed job execution plan P1, the estimated total cost is the sum of the estimated execution cost for each stage and link as follows:

cost(P1)=Sum of all cost(X, P1) for every stage and link X in the ETL job, where cost(X, P1)=unitcost(X, P1)*size(X, P1)

The total search space for the distributed job execution plans contain the legitimate mapping( ) functions. The stage mappings are automatically determined once particular link mappings are decided. In certain embodiments, a mapping( ) function with respect to a job execution plan P1 is legitimate if and only if all the following rules are true:

1) If mapping(X1, P1)="ETLServerN", then both mapping(S1,P1) and mapping(S2,P1) must be equal to "ETLServerN" as well, where X1 is a link that connects two stages S1 and S2.
2) If mapping(X1, P1)="ETLServerN1–ETLServerN2", then mapping(S1,P1)="ETLServerN1" and mapping(S2,P1)="ETLServerN2", where X1 is a link that connects two stages S1 and S2.
3) If mapping(S1, P1)="ETLServerN", then mapping(X1, P1) must be equal to "ETLServerN" or "ETLServerN-ETLServerM", where X1 is an output link of stage S1, and ETLServerM is a different ETL server than ETLServerN.
4) If mapping(S2, P1)="ETLServerM", then mapping(X1,P1) must be equal to "ETLServerM" or "ETLServerN-ETLServerM", where X1 is an input link of stage S2, and ETLServerN is a different ETL server than ETLServerM.

As mentioned earlier, the notation mapping(x,P1)=n represents the mapping of x, which is either a stage or link, with respect to a distributed job execution plan P1 to ETL server n. Therefore, a candidate plan P1 is represented by mapping (x, P1)=n for every link and stage, x, in the original data flow graph for the ETL job (FIG. 4).

Among all the candidate distributed execution plans, the DBO engine 120*a* . . . 120*n* relies on the above rules to validate whether a specific distributed execution plan is legitimate. These rules were derived based on the flow design of the original ETL job and the inter-links between ETL servers in the distributed system. In certain embodiments, a distributed system is a network of machines. For example, the network (and its interconnections) of ETLServer1, ETLServer2, and ETLServer3, as well as, the source data sources and target data sources constitute a distributed system. In certain embodiments, a plan is legitimate if and only if it can be implemented on the underlying distributed system. The following examples illustrate the rules:

With rule 1, if mapping(link1,P)=ETLServer2 then both mapping(X1_1,P) and mapping(Join_1,P) must all be equal to ETLServer2. This is due to the fact that link1 is the link connecting stage X1_1 and stage Join_1 in the original ETL job (FIG. 4).

With rule 2, if mapping(link13,P)=ETLServer2–ETLServer1, then mapping(Aggregation_1,P)=ETLServer2 and mapping(Join_3,P)=ETLServer1. This is because "link13" is the link connecting stage "Aggregation_1" and stage "Join_3" in the original ETL job (FIG. 4), and the fact that "link13" is mapped to the inter-link between ETLServer2 and ETLServer1.

Rule 3 states that if a stage X1 is mapped to ETLServerA, then its output link L1 is either mapped to the same ETLServerA or to an inter-link ETLServerA-ETLServerB, assuming the inter-link between ETLServerA and ETLServerB does exist.

Rule 4 states that if a stage Y1 is mapped to ETLServerB, then its input link L1 must be either mapped to the same ETLServerB or to an inter-link ETLServerA-ETLServerB assuming the inter-link between ETLServerA and ETLServerB does exist.

The depth-first search process first finds a legitimate mapping( ) function by selecting the first valid mapping for each link in a top down fashion. Then, the depth-first search process tries to find the second legitimate mapping( ) function by first looking for the next valid mapping for the last link until it exhausts all the valid mappings for the last link. The search for the remaining legitimate mapping( )

functions continues from bottom up until no more legitimate mapping( ) functions can be found.

In the case of the optimization level "depth-first limited N", the depth-first search process stops after N number of legitimate mapping( ) functions have been found.

The breadth-first search process tries to find all valid mapping for each link before considering any mappings for the remaining links. For example, if link1 has 3 valid mappings and link2 has 2 valid mappings, the breadth-first search process first records the three possible mappings for link1 before considering any mappings for link2. So, the breadth-first search process records 6 possible combinations for combined link1 and link2 mappings. If the ETL job contains many links, the exhausted search approach may keep track of a large number of combinations.

The "breadth-first limited N" optimization level limits the number of valid mappings recorded to a maximum number of N.

Figure 13:
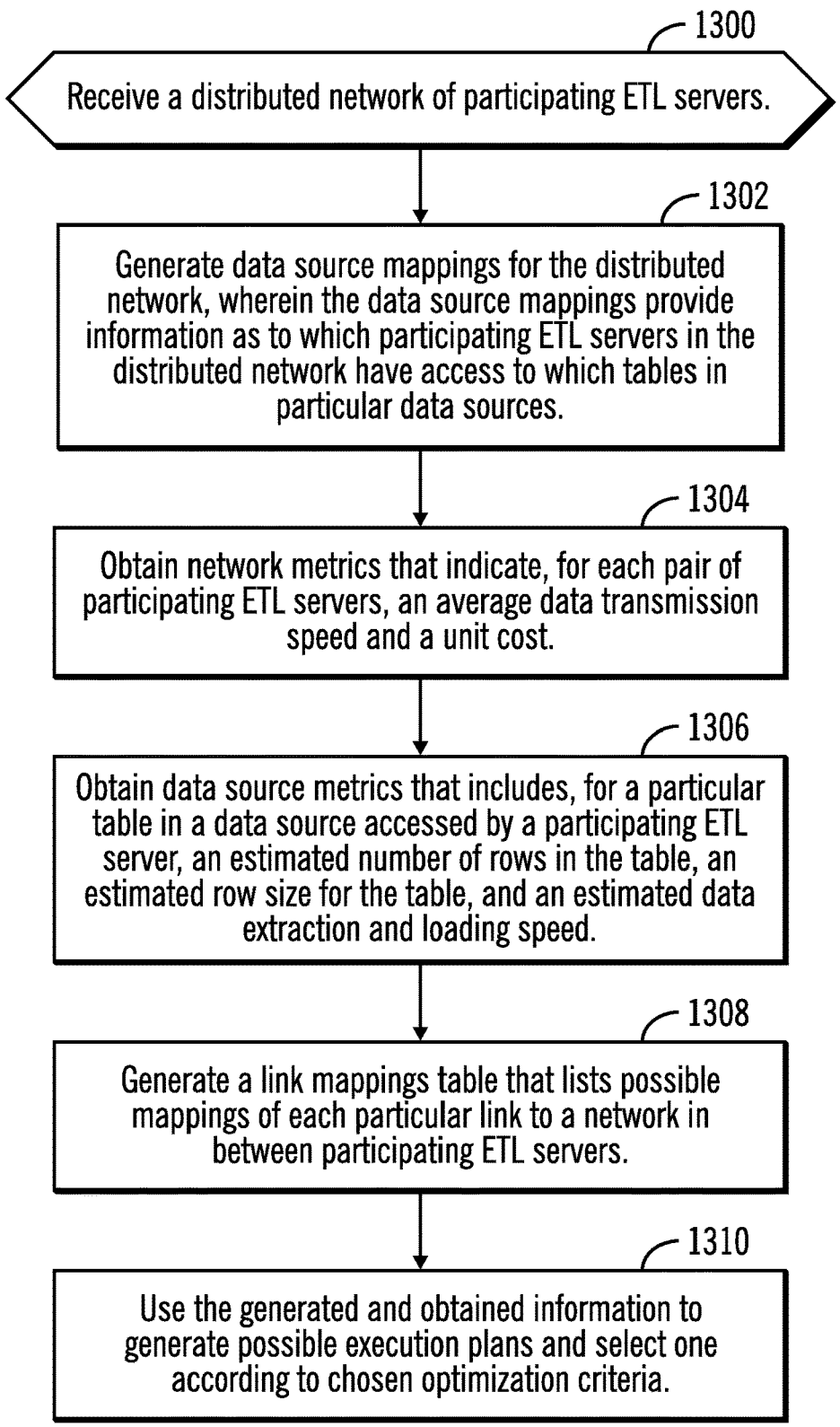
FIG. 13 illustrates, in a flowchart, operations for collection information for use in generating an optimized distributed execution plan in accordance with certain embodiments.

FIG. 13 illustrates, in a flowchart, operations for collecting information for use in generating an optimized distributed execution plan in accordance with certain embodiments. In FIG. 13, block 1300 corresponds to FIG. 2, block 1302 corresponds to FIG. 3, block 1304 corresponds to FIG. 5, block 1306 corresponds to FIG. 6, block 1308 corresponds to FIG. 10, block 1310 corresponds to FIG. 7. Block 1310 corresponds to block 904 and block 906 of FIG. 9.

In, FIG. 13, control begins at block 1300 with the DBO engine 120a . . . 120n receives a distributed network of participating ETL servers. In block 1302, the DBO engine 120a . . . 120n generates data source mappings for the distributed network, wherein the data source mappings provide information as to which participating ETL servers in the distributed network have access to which tables in particular data sources. In block 1304, the DBO engine 120a . . . 120n obtains network metrics that indicate, for each pair of participating ETL servers, an average data transmission speed and a unit cost. In block 1306, the DBO engine 120a . . . 120n obtains data source metrics that includes, for a particular table in a data source accessed by a participating ETL server, an estimated number of rows in the table, an estimated row size for the table, and an estimated data extraction and loading speed. In block 1308, the DBO engine 120a . . . 120n generates a link mappings table that lists possible mappings of each particular link to a network in between participating ETL servers. In block 1310, the DBO engine 120a . . . 120n uses the generated and obtained information to generate possible execution plans and select one according to the chosen optimization criterion.

Thus, with embodiments, in the case that participating ETL servers reside in potentially different isolated subnets in the same local network and collaboratively execute ETL jobs in a certain way, the DBO engine 120a . . . 120n logically distributes the job segments to each participating ETL server. In this case, the speed for each link is more or less similar (unless multiple switches with different speeds are used) and usually faster than the remote network. Also, the connecting ETL network stages may use more efficient protocols.

In a distributed network environment, subsets (or fragments) of a data table may reside in different locations. The DBO engine 120a . . . 120n may be extended to support this scenario. The data source mappings table may be extended with some extra information that defines the table fragment. For example, if the fragment is defined by a "key range" by its data source or ETL server, the key range may be added to the data source mappings table. The DBO engine 120a . . . 120n then checks if one or multiple job segments need to be created in order to extract enough data from the distributed fragments of the data table. The base cost and speed information are then based on individual table fragments and do not incur additional changes to the algorithm.

Thus, embodiments achieve distributed balanced optimization for an ETL job and distribute the workload to several different ETL servers based on certain well defined criteria. The distributed balanced optimization enables an automatic distributed data integration process. Application tools may offer a view of distributed ETL jobs and rely on the distributed balanced optimization to automatically find the best distributed job execution plan based on some well-defined optimization criteria and the desired optimization level.

The optimized distributed job execution plan facilitates the automatic real-time execution of the distributed job segments in both remote network and local grid scenarios (where local grid refers to ETL servers that reside, potentially, in separate independent sub-networks in the local network). With a local grid, two participating ETL servers are physically close to each other, compared to remote network settings.

As a result, unnecessary data movements across the network or grid system may be avoided and redundant data processing may be reduced as a result of less data moved across network or systems.

Embodiments allow efficient and optimal utilization of infrastructure and resources (remote and local). Embodiments avoid inconsistent data join or consolidation across remote networks due to the lack of an automatic and holistic data integration process. Embodiments minimize data shipments and recalculation based on different optimization criteria. Embodiments reduce network congestion compared to the ad-hoc way of shipping arbitrary intermediate data to/from remote systems for a similar purpose.

Embodiments provide a technique balancing ETL jobs across distributed systems based on optimization criteria by: determining an optimization plan for an ETL job to meet an optimization criteria across a plurality of distributed systems, wherein the optimization plan utilizes statistical predictions according to historical data collected and analyzed and attempts to reduce data movement and redundancies considering input and output data access and load predictions to balance workloads across the plurality of systems. Embodiments maintain statistical metadata about data sources, tables, and data extraction speed, network speed, data transaction costs [over the network], data processing speed, and data processing costs. Embodiments break the ETL job into workload mappings [for example link, stage, network, metrics]. Embodiments adjust the workload mapping according to cost and speed criteria rules to form a plan. Embodiments execute the plan across the plurality of systems. Embodiments select a final execution plan from a set of workload mappings based on the optimization criteria selected from a group consisting of minimum time, minimum cost, minimum time within a set maximum cost, and minimum cost within a set maximum time.

Embodiments provide distributed balanced optimization that transforms an entire ETL job into one or more optimized job segments based on the accessibility of data, minimum total job execution cost and/or total job execution time. These job segments are submitted to their corresponding target ETL servers by the originating ETL server through a distributed job orchestrating mechanism. The execution of the whole ETL job may then be jointly carried out by all the participating ETL servers in a distributed network. Embodiments also provide a new stage, "ETL network stage", that serves as an input stage that receives data and control signals from ETL network stages on other ETL servers or an output stage that sends data and control signal to ETL network stages on other ETL servers.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 14:
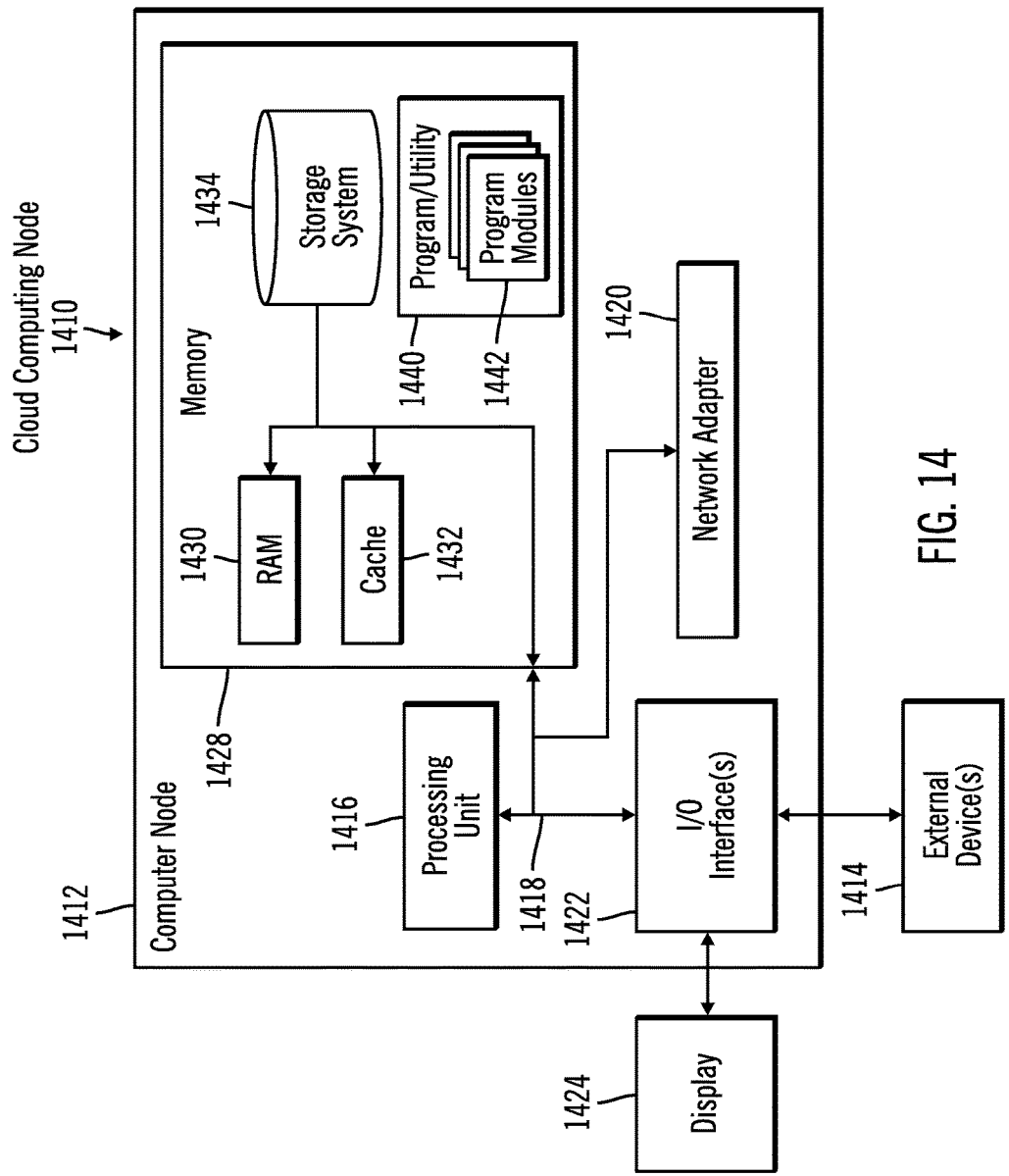
FIG. 14 illustrates a cloud computing node in accordance with certain embodiments.

Referring now to FIG. 14, a schematic of an example of a cloud computing node is shown. Cloud computing node 1410 is only one example of a suitable cloud computing node and is not intended to suggest any limitation as to the scope of use or functionality of embodiments of the invention described herein. Regardless, cloud computing node 1410 is capable of being implemented and/or performing any of the functionality set forth hereinabove.

In cloud computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
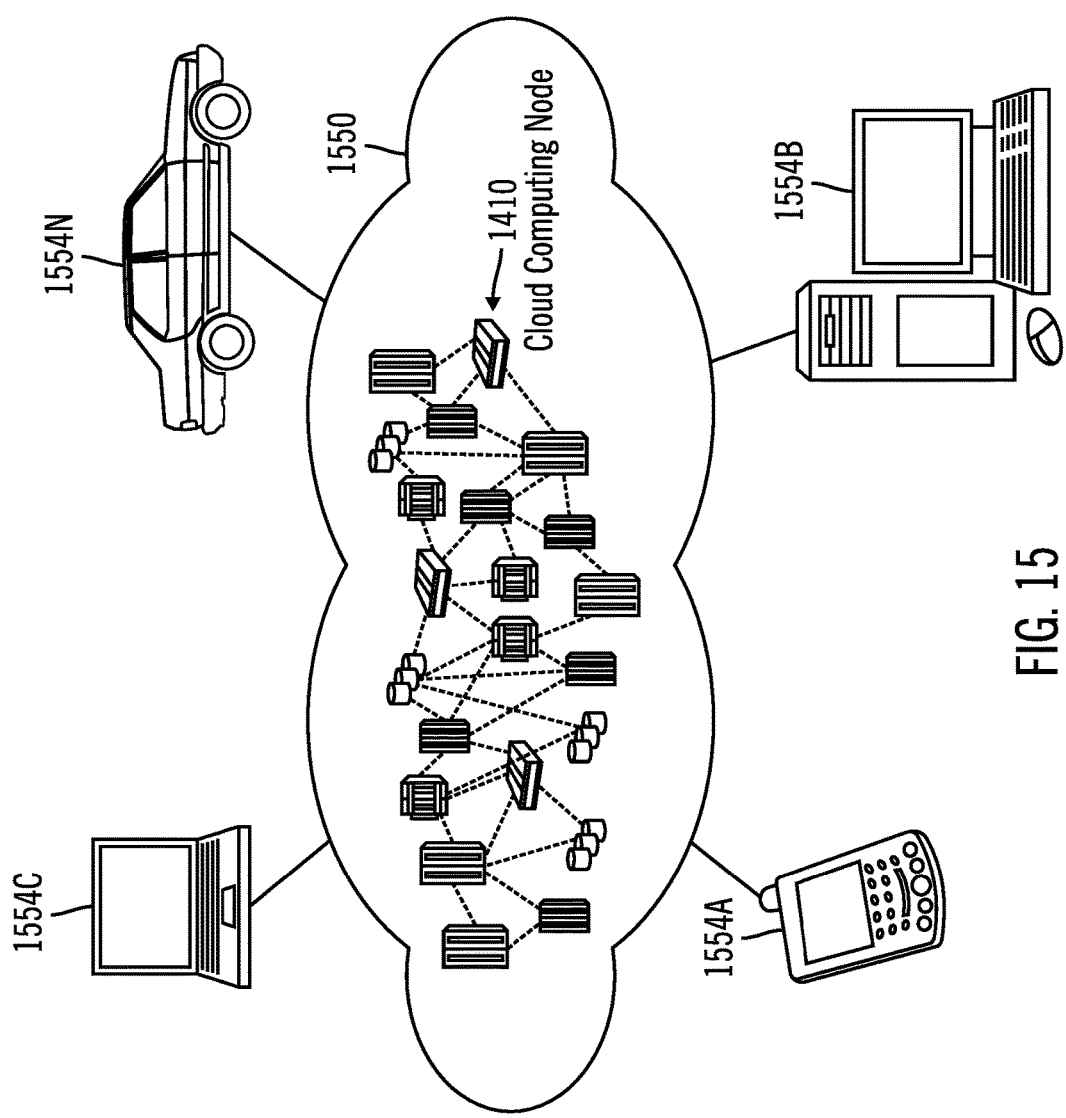
FIG. 15 illustrates a cloud computing environment in accordance with certain embodiments.

Referring now to FIG. 15, illustrative cloud computing environment 1550 is depicted. As shown, cloud computing environment 1550 comprises one or more cloud computing nodes 1410 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1410 and cloud computing environment 1550 can communicate with any type of computerized device over any type of network and/or network addressable connection (e.g., using a web browser).

Figure 16:
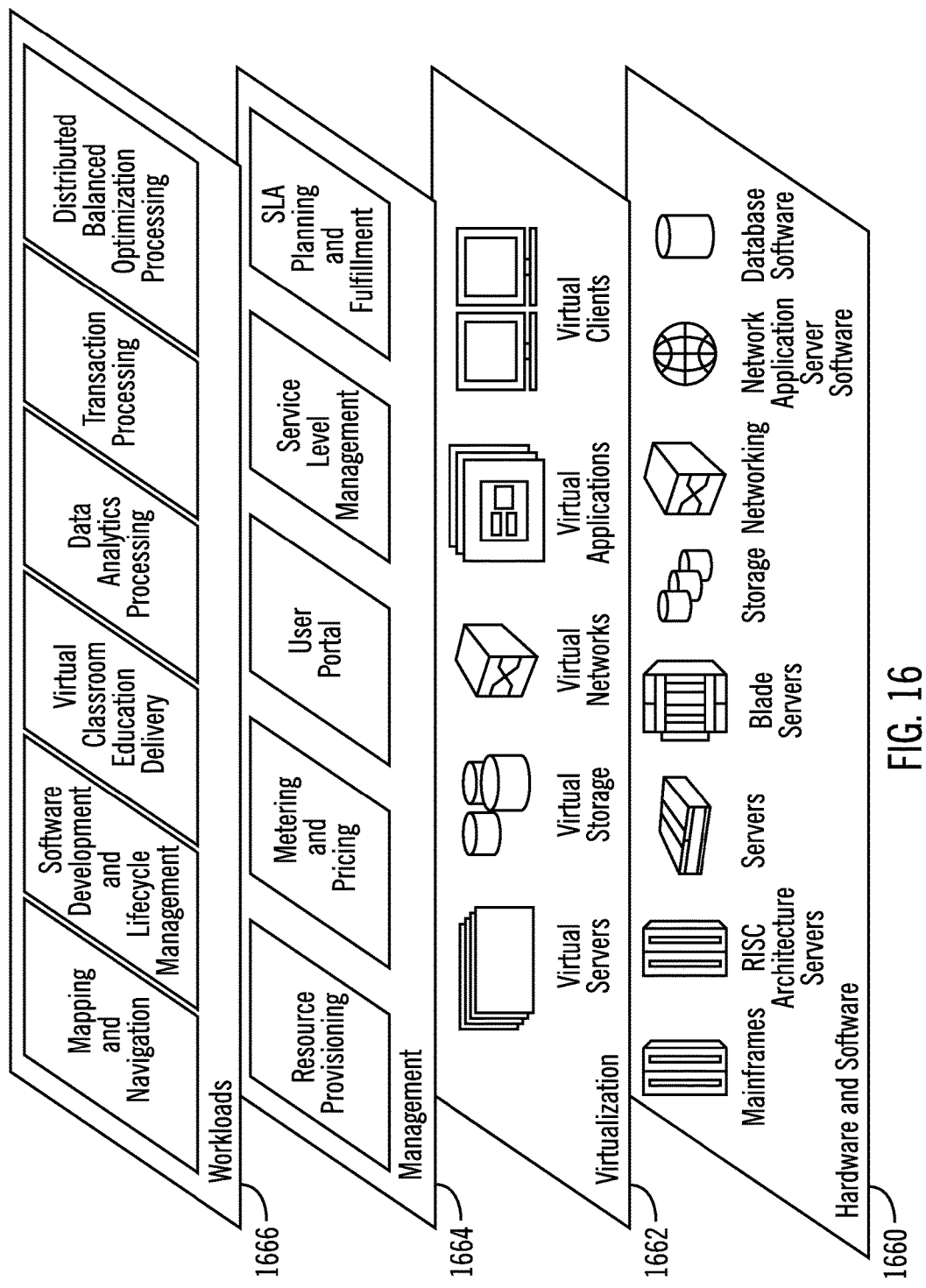
FIG. 16 illustrates abstraction model layers in accordance with certain embodiments.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and distributed balanced optimization processing.

Thus, in certain embodiments, software or a program, implementing distributed balanced optimization processing in accordance with embodiments described herein, is provided as a service in a cloud environment.

In certain embodiments, ETL server 110*a* . . . 110*n* each have the architecture of computing node 1410. In certain embodiments, one or more of the ETL servers 110*a* . . . 110*n* are part of a cloud environment. In certain alternative embodiments, the ETL servers 110*a* . . . 110*n* are not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for distributed balanced optimization of an Extract Transform Load (ETL) job across distributed systems of participating ETL servers, the computer program product comprising a computer readable storage medium having program code embodied therewith, the program code executable by at least one processor to perform:
    receiving a data flow graph with links and stages for an ETL job to be executed by participating ETL servers, wherein the stages include multiple source system stages and one or more partition aggregation stages, wherein the multiple source system stages account for distributed table partitions for a complete data extraction of tables, and wherein the one or more partition aggregation stages combine data extracted from the distributed table partitions;
    generating multiple distributed job execution plans for the data flow graph based on data source mappings that indicate which participating ETL servers have access to which of the tables in particular data sources and link mappings that indicate one or more networks associated with the participating ETL servers for each of the links;
    selecting a distributed job execution plan from the multiple distributed job execution plans that meets an optimization criteria, wherein the distributed job execution plan breaks the data flow graph into job segments that each include a subset of the links and stages and map to a different participating ETL server from the participating ETL servers wherein the distributed job execution plan utilizes statistics to reduce data movement and redundancies and to balance workloads across the distributed systems; and
    distributing each of the job segments to the participating ETL servers based on the mappings for parallel execution.

2. The computer program product of claim 1, wherein the data flow graph includes an ETL network stage that, for output stages, sends data and control signals to ETL network stages on other nodes and, for input stages, receives data and control signals from ETL network stages on other nodes.

3. The computer program product of claim 1, wherein the program code is executable by the at least one processor to perform:
    maintaining statistical metadata about the particular data sources, the tables, data extraction speed, network speed, data transmission costs, data processing speed, and data processing costs.

4. The computer program product o claim 1, wherein the optimization criteria are selected from a group consisting of minimum time, minimum cost, minimum time within a set maximum cost, and minimum cost within a set maximum time.

5. The computer program product of claim 1, wherein the program code is executable by the at least one processor to perform:
    adding a workload of each participating ETL server to a data source registry for use in selecting one of multiple execution plans that do not exceed a target ETL server capacity; and
    adding a new workload option to utilize server workload information.

6. The computer program product of 1, wherein a Software as a Service (SaaS) is configured to perform computer program product operations.

7. A computer system for distributed balanced optimization of an Extract Transform Load (ETL) job across distributed systems of participating ETL servers, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:
    receiving a data flow graph with links and stages for an ETL job to be executed by participating ETL servers, wherein the stages include multiple source system stages and one or more partition aggregation stages, wherein the multiple source system stages account for distributed table partitions for a complete data extraction of tables, and wherein the one or more partition aggregation stages combine data extracted from the distributed table partitions;
    generating multiple distributed job execution plans for the data flow graph based on data source mappings that indicate which participating ETL servers have access to which of the tables in particular data sources and link mappings that indicate one or more networks associated with the participating ETL servers for each of the links;
    selecting a distributed job execution plan from the multiple distributed job execution plans that meets an optimization criteria, wherein the distributed job execution plan breaks the data flow graph into job segments that each include a subset of the links and stages and map to a different participating ETL server from the participating ETL servers, wherein the distributed job execution plan utilizes statistics to reduce data movement and redundancies and to balance workloads across the distributed systems; and distributing each of the job segments to the participating ETL servers based on the mappings for parallel execution.

8. The computer system of claim 7, wherein the data flow graph includes an ETL network stage that, for output stages, sends data and control signals to ETL network stages on other nodes and, for input stages, receives data and control signals from ETL network stages on other nodes.

9. The computer system of claim 7, wherein the operations further comprise:
maintaining statistical metadata about the particular data sources, the tables, data extraction speed, network speed, data transmission costs, data processing speed, and data processing costs.

10. The computer system of claim 7, wherein a Software as a Service (SaaS) is configured to perform system operations.

11. The computer system of claim 7, wherein the optimization criteria are selected from a group consisting of minimum time, minimum cost, minimum time within a set maximum cost, and minimum cost within a set maximum time.

12. The computer system of claim 7, wherein the operations further comprise:
adding a workload of each participating ETL server to a data source registry for use in selecting one of multiple execution plans that do not exceed a target ETL server capacity; and
adding a new workload option to utilize server workload information.

* * * * *